(12) United States Patent
Zhang et al.

(10) Patent No.: US 7,940,971 B2
(45) Date of Patent: May 10, 2011

(54) SYSTEM AND METHOD FOR CORONARY DIGITAL SUBTRACTION ANGIOGRAPHY

(75) Inventors: Wei Zhang, Plainsboro, NJ (US);
Adrian Barbu, Tallahassee, FL (US);
Simone Prummer, Neunkirchen am Brand (DE); Martin Ostermeier, Buckenhof (DE); Chandan K. Reddy, Troy, MI (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 964 days.

(21) Appl. No.: 11/779,405

(22) Filed: Jul. 18, 2007

(65) Prior Publication Data
US 2008/0025588 A1 Jan. 31, 2008

Related U.S. Application Data

(60) Provisional application No. 60/820,144, filed on Jul. 24, 2006, provisional application No. 60/946,738, filed on Jun. 28, 2007.

(51) Int. Cl.
*G06K 9/00* (2006.01)
(52) U.S. Cl. ............... 382/128; 128/922; 378/4
(58) Field of Classification Search .......... 382/100, 382/128, 129, 130, 131, 132; 128/922; 378/4–27
See application file for complete search history.

(56) References Cited

U.S. PATENT DOCUMENTS

| | | | | | |
|---|---|---|---|---|---|
| 4,689,670 | A | * | 8/1987 | Okazaki | 378/98.5 |
| 5,557,684 | A | * | 9/1996 | Wang et al. | |
| 5,586,201 | A | * | 12/1996 | Whiting et al. | 378/98.2 |
| 6,826,292 | B1 | * | 11/2004 | Tao et al. | |
| 6,987,865 | B1 | * | 1/2006 | Szeliski et al. | |
| 7,155,032 | B2 | * | 12/2006 | Szeliski et al. | |
| 2006/0285747 | A1 | * | 12/2006 | Blake et al. | |
| 2007/0116356 | A1 | * | 5/2007 | Gong et al. | |
| 2008/0025588 | A1 | * | 1/2008 | Zhang et al. | 382/130 |
| 2010/0183196 | A1 | * | 7/2010 | Fu et al. | 382/103 |

OTHER PUBLICATIONS

Barbu, A. et al., "Hierarchical Learning of Curves Application to Guidewire Localization in Fluoroscopy," IEEE International Conference on Computer Vision and Pattern Recognition, Minneapolis, MN 2007.
Coleman, T. F. et al., "A Reflective Newton Method for Minimizing a Quadratic Function Subject to Bounds on some of the Variables," SIAM Journal on Optimization. Jun. 4, 1996.
Tu, Z, "Probabilistic Boosting-Tree, Learning Discriminative Models for Classification, Recognition, and Clustering," IEEE International Conference on Computer Vision, Beijing, China 2006.

* cited by examiner

*Primary Examiner* — Anand Bhatnagar (57) ABSTRACT

A method and system for extracting motion-based layers from fluoroscopic image sequences are disclosed. Portions of multiple objects, such as anatomical structures, are detected in the fluoroscopic images. Motion of the objects is estimated between the images is the sequence of fluoroscopic images. The images in the fluoroscopic image sequence are then divided into layers based on the estimated motion. In a particular implementation, the coronary vessel tree and the diaphragm can be extracted in separate motion layers from coronary angiograph fluoroscopic image sequence.

28 Claims, 8 Drawing Sheets

SYSTEM AND METHOD FOR CORONARY DIGITAL SUBTRACTION ANGIOGRAPHY

This application claims the benefit of U.S. Provisional Application No. 60/820,144, filed Jul. 24, 2006, and U.S. Provisional Application No. 60/946,738, filed Jun. 28, 2007, the disclosures of which are herein incorporated by reference.

BACKGROUND OF THE INVENTION

The present invention relates to fluoroscopic image sequences, and more particularly to extracting motion-based layers from fluoroscopic image sequences.

Angiography is a medical imaging technique in which X-ray images are used to visualize internal blood filled structures, such as arteries, veins, and the heart chambers. Since blood has the same radiodensity as the surrounding tissues, these blood filled structures cannot be differentiated from the surrounding tissue using conventional radiology. Thus, in angiography, a contrast agent is added to the blood, usually via a catheter, to make the blood vessels visible via X-ray. In many angiography procedures, X-ray images are taken over a period of time, which results in a sequence of fluoroscopic images, which show the motion of the blood over the period of time. Such fluoroscopic image sequences contain useful information that can be difficult to decipher due to the collapsing of 3-dimensional information into the 2-dimensional images.

In traditional computer imaging problems of motion estimation, occlusion handling or motion segmentation are typically the main concerns. Accordingly, traditional techniques for extracting objects of interest from image sequences typically use intensity based approaches to differentiate between objects in the image sequences. However, such traditional techniques can yield erroneous results in medical image sequences, such as fluoroscopic image sequences, which are generated using the phenomenon of transparency. Since various internal structures have different levels of transparency in the fluoroscopic images, these structures can overlap, and it may be difficult to accurately distinguish between these structures in the fluoroscopic image sequences using the traditional intensity based approaches.

BRIEF SUMMARY OF THE INVENTION

The present invention provides a method and system for extracting motion-based layers from fluoroscopic image sequences. Different objects in a fluoroscopic image sequence have different patterns of motion. Embodiments of the present invention utilize this fact to extract objects from a fluoroscopic image sequence in layers based on the motion patterns found in the fluoroscopic image sequence.

In one embodiment of the present invention, portions of multiple objects, such as anatomical structures, are detected in a sequence of fluoroscopic images. Motion of the detected portions of the objects is estimated between the consecutive images in the sequence of fluoroscopic images. The images in the sequence of fluoroscopic images are then divided into multiple layers based on the estimated motion of the detected portions of the multiple objects.

In a particular embodiment of the present invention, the coronary tree and the diaphragm are detected in frames of a coronary angiograph fluoroscopic image sequence. Motion vectors are calculated for the diaphragm and the vessel tree between consecutive frames of the fluoroscopic image sequence. A thin-plate spline model is used to extrapolate motion fields over the entire frame based on the motion vectors, and least squares estimation is used to extract the vessel tree and diaphragm in separate layers based on the motion fields.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a method for extracting motion-based layers from fluoroscopic images. Embodiments of the present invention are described herein to give a visual understanding of the motion layer extraction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
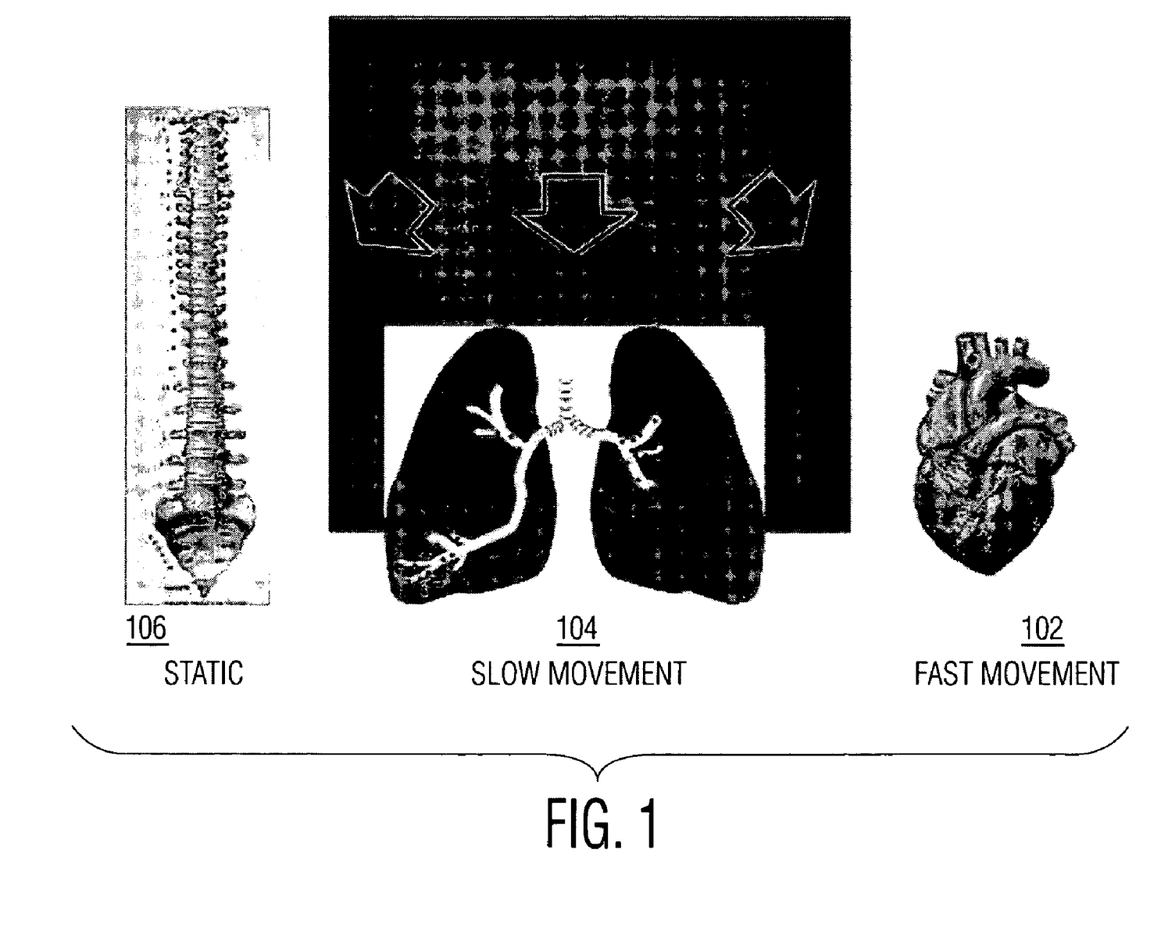
FIG. 1 illustrates the separation of layers of a fluoroscopic image based on relative motion.

A sequence of fluoroscopic images contains multiple X-ray images obtained in real time. The X-ray images record a certain field of view of a time period. Accordingly, motion of objects within the field of view can be observed in a sequence of fluoroscopic images. However, in a given sequence of fluoroscopic images, different objects (e.g. heart lungs, bones, etc.) have different patterns of motion. For example, due to the beating of the heart, the motion of the heart is faster than that of the lungs. In addition, the bones and spine usually remain static throughout a sequence of fluoroscopic images. By utilizing this motion information, it is possible to separate transparent layers from the fluoroscopic images based on relative motion of objects in the fluoroscopic images. FIG. 1 illustrates the separation of layers of a fluoroscopic image based on relative motion. A fluoroscopic image 100 can be separated into three layers based on the relative motion of the layers (fast, slow, static). Since the motion of the heart 102 is faster than that of the lungs 104, the heart 102 and coronary tree can be separated from the rest of the image 100 by the fast movement layer. Similarly, the lungs 104 can be separated from the rest of the image 100 by the slow movement layer. Static objects such as the spine 106, as well as background, can be separated from the image 100 the static layer. It is to be understood that the heart 102, lungs 104, and spine 106 shown in FIG. 1 are representative of objects that can be extracted using the motion-based layers separation framework.

Figure 2:
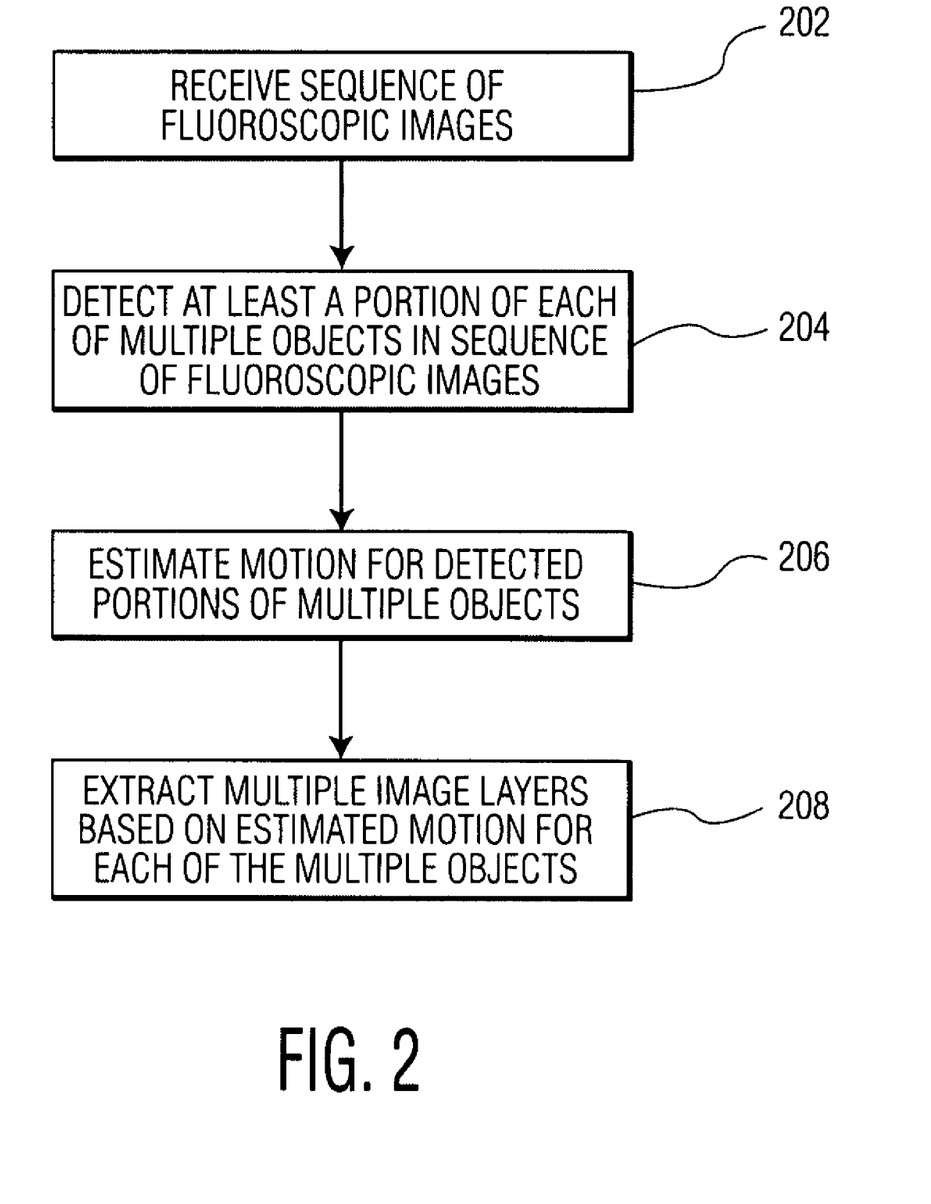
FIG. 2 illustrates a method of extracting motion-based layers from a sequence of fluoroscopic images according to an embodiment of the present invention.

FIG. 2 illustrates a method of extracting motion-based layers from a sequence of fluoroscopic images according to an embodiment of the present invention. At step 202, a sequence of fluoroscopic images is received. The sequence of fluoroscopic images can be electronic data representing images resulting from an X-ray procedure, such as an angiograph. The sequence of fluoroscopic images are images of a region taken at a regular interval over a time frame. Each image in the sequence can be referred to as a frame.

At step 204, at least a portion of each of multiple objects is detected in the sequence of fluoroscopic images. The objects may be anatomical structures such as the heart, the lungs, the diaphragm, the vessel tree, etc. The objects may also be non-anatomical objects such as a stent or guidewire. The objects may be detected manually, by a user annotating the fluoroscopic images, however, in an advantageous embodiment of the present invention, the objects are detected automatically. For example, the objects may be detected automatically using learning-based detection methods.

At step 206, motion is estimated for the detected portions of each of the multiple objects in the sequence of fluoroscopic images. The motion can be estimated for an object in the sequence of images by obtaining motion vectors between consecutive frames of the sequence of fluoroscopic images. The motion vectors may be obtained manually by a user annotating an object in consecutive frames, however, in a preferred embodiment of the present invention, the motion vectors are obtained automatically. For example, the motion vectors may be obtained using learning based tracking methods to track the detected portions of the objects between consecutive frames. It is possible to represent the motion estimated for each object using a thin-plate spline model.

At step 208, multiple image layers are extracted from the sequence of fluoroscopic images based on the motion estimated for each of the detected objects. Each motion-based layer includes a sequence of images corresponding to portions of the original sequence of fluoroscopic images having similar relative motion. The motion-based layers can be extracted from the sequence of fluoroscopic images using a least square estimation problem. The image layers are estimated for each frame using motion information of multiple frames. For example, 9 frames including the current frame, the previous 4 frames, and the following 4 frames can be used to estimate the image layers for a frame. It is to be understood, that this number of frames is exemplary, and various embodiments of the present invention may utilize the motion information from more or less frames. After layers of every individual frame are estimated, images of the same layer can be used to form a video (sequence of images) of that layer. For example, such a video of a single layer can be used to observe motion of a specific anatomical structure in that layer, such as a video which contains only the coronary vessel tree.

Figure 3:
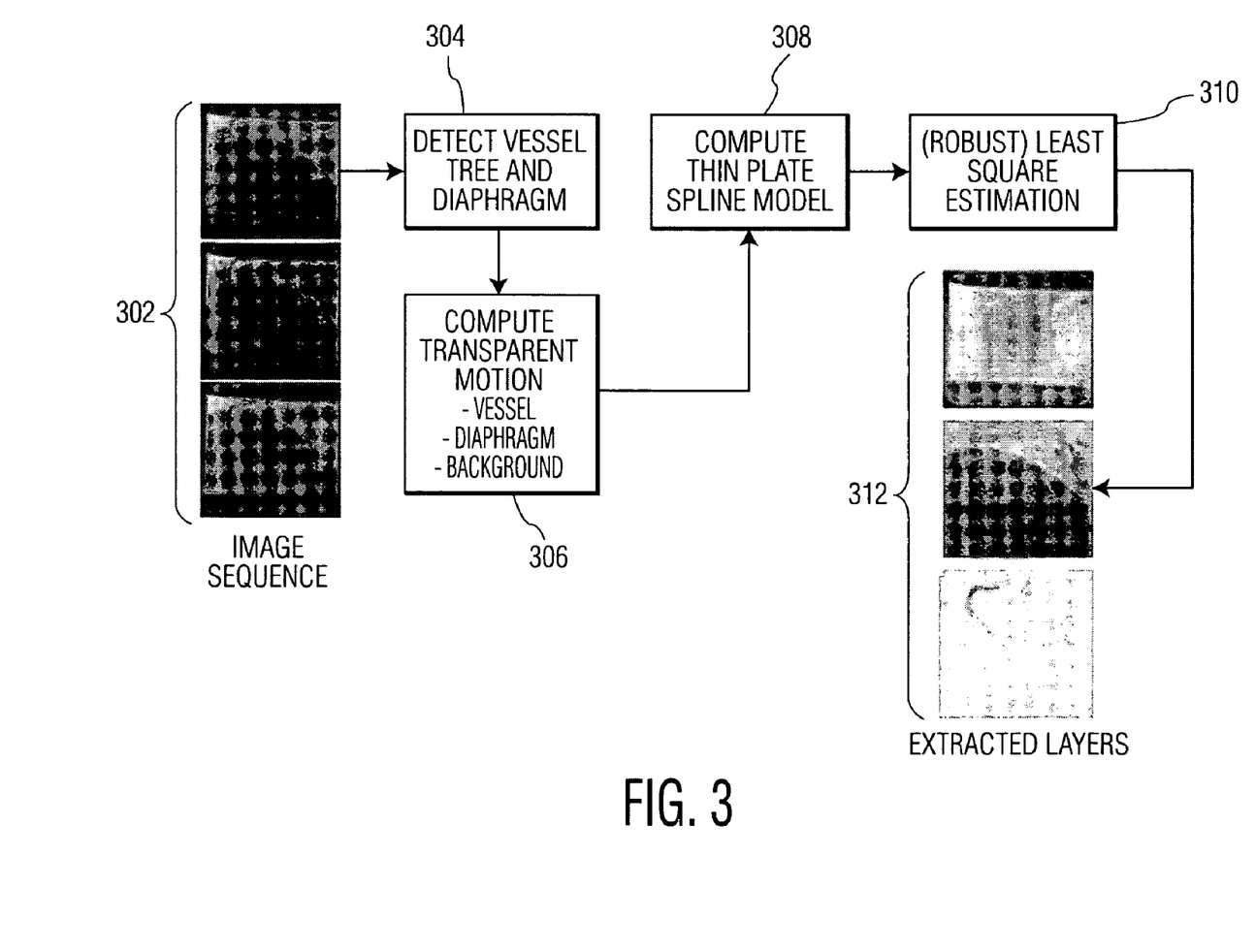
FIG. 3 illustrates a coronary digital subtraction angiography method according to an embodiment of the present invention.

The method of FIG. 2 is explained in greater detail by providing an example of a particular embodiment of the present invention as shown in FIG. 3. FIG. 3 illustrates an embodiment of the present invention in which the method of FIG. 2 is used to extract the coronary tree (vessel tree) from a fluoroscopic image sequence resulting from a coronary angiography. The method shown in FIG. 3 can be referred to as coronary Digital Subtraction Angiography (DSA). Although the present invention is described in detail by referring to this particular embodiment, the present invention is not limited thereto, and can be similarly implemented in other types of fluoroscopic image sequences.

As illustrated in FIG. 3, a fluoroscopic image sequence 302 including multiple frames is received. At step 302, portions of the vessel tree and the diaphragm are detected in each frame of the fluoroscopic image sequence. A learning-based detection method can be used to automatically detected the medial axes of the vessels and the boundary of the diaphragm. The vessel segmentation can be performed by discriminating patterns in the joint 2D-temporal domains. This may employ learning algorithms such as marginal space learning and probabilistic boosting tree, but the present invention is not restricted thereto. Marginal space learning is described in detail in Adrian et al., "Hierarchical Learning of Curves: Application to Guidewire Localization in Fluoroscopy", IEEE International Conference on Computer Vision and Pattern Recognition, Minneapolis, Minn., 2007, which is incorporated herein by reference. Probabilistic boosting tree is described in detail in Zhuowen et al., "Probabilistic Boosting-Tree: Learning Discriminative Models for Classification, Recognition, and Clustering", IEEE International Conference on Computer Vision, Beijing, China, 2006, which is incorporated herein by reference.

Figure 4:
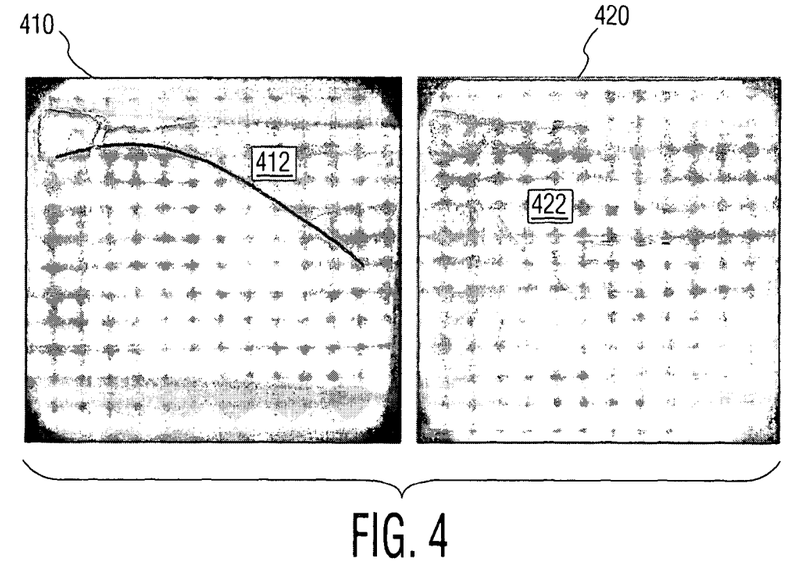
FIG. 4 illustrates detection of the diaphragm and the vessel tree in a frame of a fluoroscopic image sequence.

FIG. 4 illustrates the detection of the boundary of the diaphragm and the medial axes of the vessels in a frame of the fluoroscopic image sequence. Image 410 of FIG. 4 shows the detected boundary 412 of the diaphragm, and image 420 of FIG. 4 shows the detected medial axes 422 of the vessels. As shown in image 420, the medial axes 422 of the vessels can be represented by splines.

Figure 5:
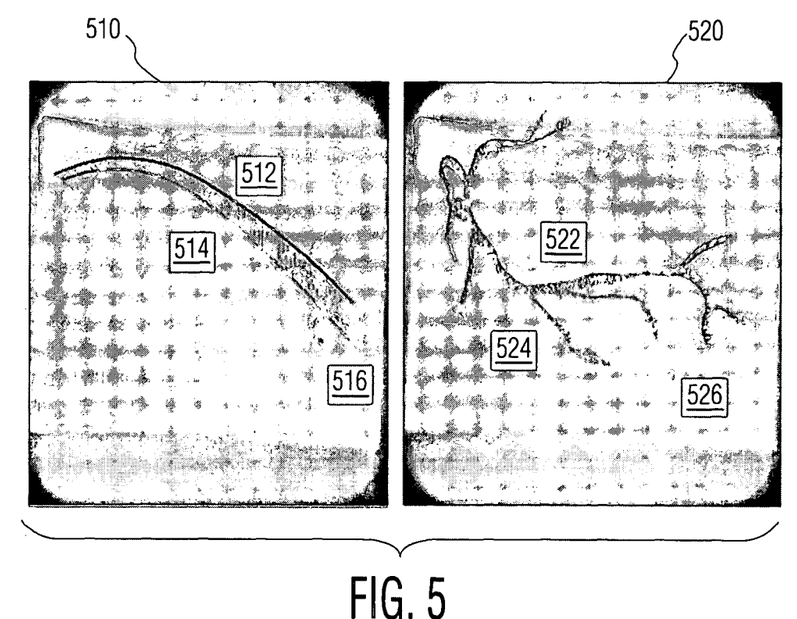
FIG. 5 illustrates estimation of motion of the diaphragm and the vessel tree between consecutive frames in a fluoroscopic image sequence.

Returning to FIG. 3, at step 306, the transparent motion is estimated for the vessel tree and the diaphragm. A learning based tracking method can be used to track the detected portions of the vessel tree and the diaphragm between consecutive frames in order to obtain motion vectors showing the motion of the vessel tree and the diaphragm between consecutive frames. For tracking, the vessel tree can be represented by the tree junctions and the vessel endpoints. These are tracked and new junctions and endpoints are connected to the tree as the contrast is injected. From the junction trajectories, a consistent tree is reconstructed and its motion can be estimated. FIG. 5 illustrates the estimation of the motion of the diaphragm and the vessel tree between consecutive frames in the fluoroscopic image sequence. Image 510 of FIG. 5 illustrates motion vectors 516 showing the motion between a first boundary 512 of the diaphragm and a second boundary 514 of the diaphragm detected in consecutive frames. Image 520 illustrates motion vectors 526 showing the motion between a first detected vessel tree 522 and a second detected vessel tree 524 detected in consecutive frames.

Figure 6:
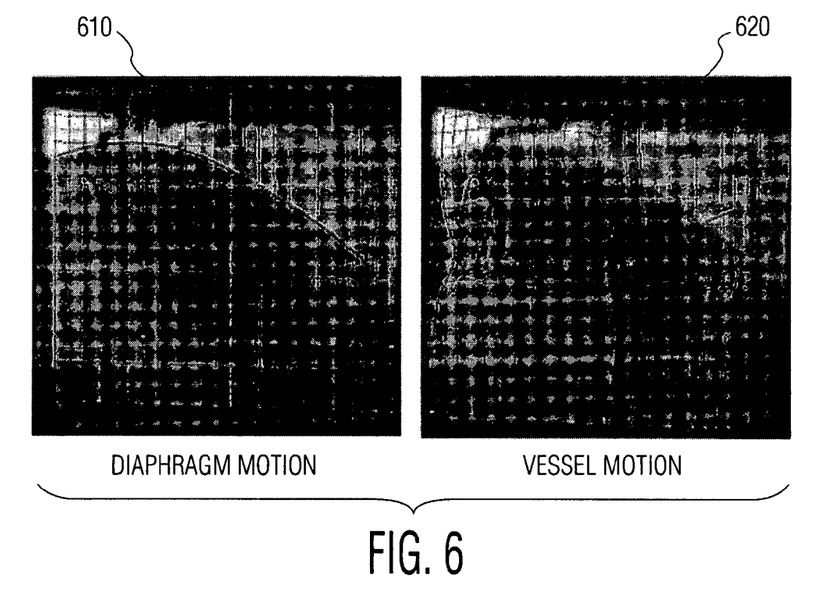
FIG. 6 illustrates extrapolated motion fields for a frame in the fluoroscopic image sequence based on motion vectors for the diaphragm and the vessel tree.

Returning to FIG. 3, at step 308, a thin-plate spline model is computed based on the motion vectors obtained for the detected portions of the objects to extrapolate the motion fields over the whole image. FIG. 6 illustrates the extrapolated motion fields for an image (frame) in the fluoroscopic image sequence based on the motion vectors for the diaphragm and the vessel tree. Image 610 of FIG. 6 illustrates the motion field extrapolated based on the estimated motion of the diaphragm, and image 620 of FIG. 6 illustrates the motion field extrapolated based on the estimated motion of the vessel tree. Thin-plate spline models are widely used as non-rigid transformation models for image alignment and shaped matching. The name "thin-plate spline" refers to a physical analogy involving the bending of a thin sheet of metal. In the physical setting, the deflection is in the z direction, orthogonal to the plane. When applied the idea to the problem of coordinate transformation, one interprets the lifting of the plate as a displacement of the x or y coordinates within the plane. One advantage of using a thin-plate spline model to represent motion in the image is that the motion field is smooth with derivatives of any order. Another advantage of the thin-plate spline is that it can always be decomposed into a global affine and a local non-affine component.

Returning to FIG. 3, at step 310 least squares estimation is used to extract layers of the fluoroscopic image sequence based on the motion fields estimated by the thin-plate spline models resulting in motion based layers 312, which can be output, displayed, stored, etc. The layer extraction problem is to extract layers from a fluoroscopic image sequence which consists of N layers with uniform transparency, i.e., the contribution of each layer to the image is 1/N. In X-ray image formation, an exponential relationship exists between the incident and transmitted photon fluence (number of photons/mm² area) after passing through a material with an attenuation coefficient $\mu$, whose thickness is x. This can be written as the following equation:

$$N_x = N_0 e^{\mu x}.$$

After passing through multiple layers of materials, the final amount of photon fluence received by a detector which generates the X-ray image is:

$$N = N_0 e^{\sum \mu_j x_j}.$$

Because of the exponential form in the X-ray image formation equation, X-ray images are often manipulated in logarithmic space. In the logarithmic space, the image can be written as a linear combination of the layers:

$$I_m = \sum_{l=1}^{N} T_l^m L_l,$$

where $I_m$ is the $m^{th}$ observed image (frame) in a sequence, $L_l$ is the $l^{th}$ layer (unknown), and $T_l^m$ is the transformation which maps the $l^{th}$ layer to the $m^{th}$ image according to the motion information. This equation holds in the ideal case when the sum of all layers is exactly equal to the observed image. In practice, this equation is an approximation because of image noise and local deformation.

Assuming there are N layers in one image, M images (frames) in a sequence can be used to find a least squares solution that minimizes the reconstruction error for the N layers, where M>N. The least squares solution can be expressed as:

$$\min \sum_{m=1}^{M} \left\| \sum_{l=1}^{N} T_l^m L_l - I_m \right\|^2.$$

The least squares problem can be very large in scale. If the width of the image is W and the height of the image is H, then the number of unknowns in the least squares problem is WHN, while the number of equations is WHM. For example, to estimate 3 layers for a sequence with image size 256×256, the number of unknowns is 196608. However, the transformation matrix $T_l^m$ is very sparse, with most of its entries having the value of zero. Accordingly, this least squares problem can be solved using an iterative optimization technique.

Since the unknowns are constrained, i.e., their value cannot be negative, this least squares problem is actually a constrained optimization problem. According to an embodiment of the present invention, it is possible to solve this constrained optimization problem using a trust region method based on an interior-reflective Newton-method. Accordingly, in each iteration, an approximate solution is obtained using a method of preconditioned conjugate gradients. Such a method is described in detail in Coleman et al., "A Reflective Newton Method for Minimizing a Quadratic Function Subject to Bounds on Some of the Variables," SIAM Journal on Optimization, Vol. 6, Number 4, pp. 1040-1058, 1996, which is incorporated herein by reference.

Figure 7:
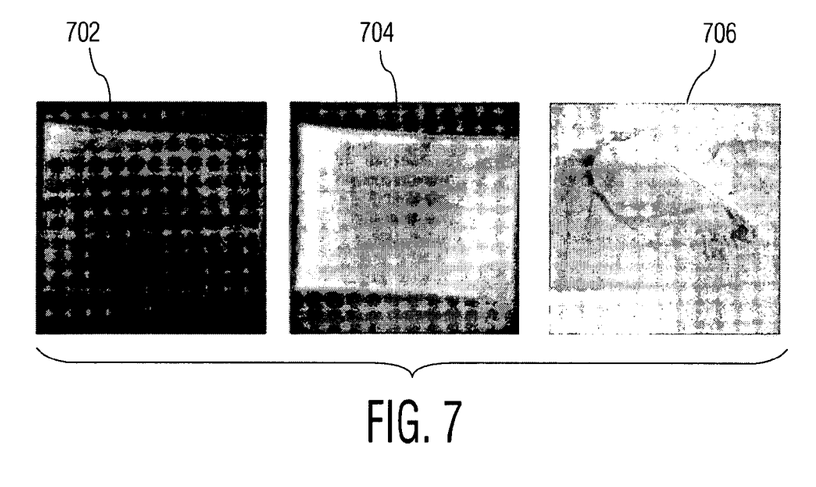
FIG. 7 illustrates removal of background from an image.

As described above, the method of FIG. 3 shows detecting the diaphragm and the vessel tree and extracting layers based on the movement thereof. It is to be understood that portions of the background of the image can also be detected so that a static layer of the image sequence can be extracted. It is also possible, according to an embodiment of the present invention, that the background can be estimated prior to detecting the various objects in the image sequence. Based on the assumption that the background does not change in the image sequence, the estimated background can then be removed from the image sequence prior to detecting the diaphragm and the vessel tree. In this way, the problem complexity can be reduced (i.e., two unknown layers instead of three). This can be implemented as a coarse to fine approach in which all the layers are estimated roughly and greater emphasis given to the moving layers. FIG. 7 illustrates removal of the background from an image. Image 702 shows an original image or frame of a fluoroscopic image sequence, image 704 shows the background which is removed from image 702, and image 706 shows the resultant image once the background 704 is removed from image 702.

Figure 8A:
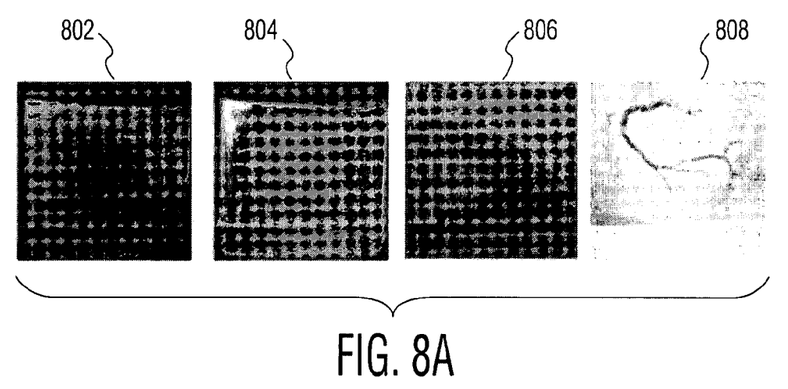
FIGS. 8A and 8B illustrate exemplary motion-based layers resulting from implementing the method of FIG. 3.
Figure 8B:
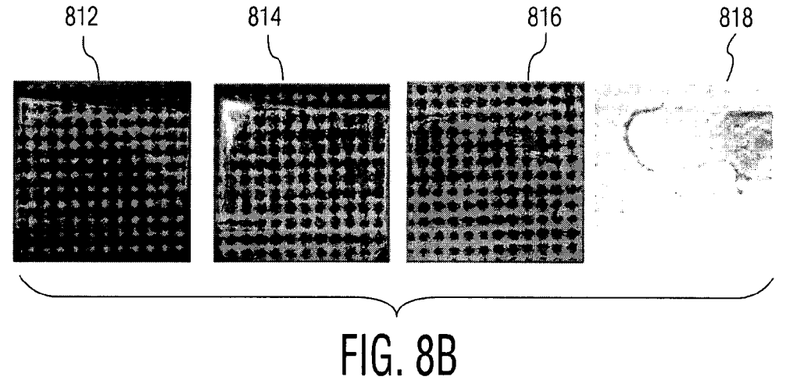

FIGS. 8A and 8B show exemplary motion-based layers resulting from an implementation of the method of FIG. 3. As illustrated in FIGS. 8A and 8B, images 802 and 804 show frames from a sequence of fluoroscopic images. Images 804 and 814 show background layers of images 802 and 812, respectively, including static objects such as bones. Images 806 and 816, show slow moving layers of images 802 and 812, respectively, including the diaphragm. Images 808 and 818 show fast moving layers of images 802 and 812, respectively, including the vessel tree. As illustrated in FIG. 8, the vessel tree is much more visible in images 808 and 818 than in the original fluoroscopic images 802 and 812.

Figure 9:
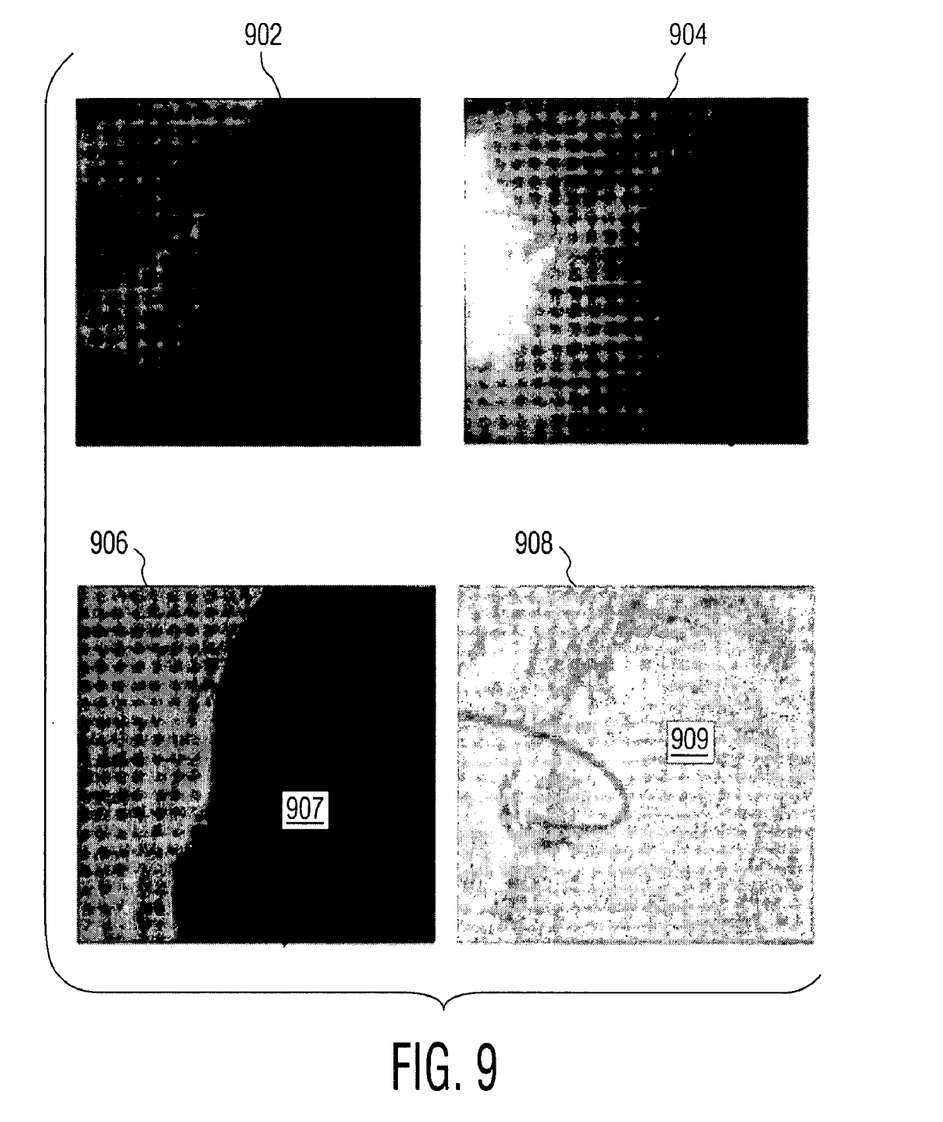
FIG. 9 illustrates exemplary motion-based layers which separate a guidewire from a lung in a sequence of fluoroscopic images.

FIG. 9 illustrates exemplary motion-based layers which separate a guidewire from a lung in a sequence of fluoroscopic images. As illustrated in FIG. 9, image 902 shows a fluoroscopic image from a sequence of fluoroscopic images. Image 904 illustrates a background layer (static layer) extracted from image 902. Image 906 illustrates a motion-based layer which clearly shows the lung 907. Image 908 illustrates a motion-based layer which clearly shows the guidewire 909. As illustrated in FIG. 9, the guidewire is difficult to see in image 902, but can be clearly seen in image 908.

One advantageous use of the methods described above is for coronary enhancement. This is especially beneficial in severely obese patients. In such patients, cardiologists often can 'barely see anything', especially with extreme angulations where the radiation has a long way through the body. The above described methods can also help to save contrast medium used in angiography procedures by overlaying a previously extracted coronary motion layer containing the contrast-filled coronaries with the contrastless frames. Also, the above described methods can detect coronaries that got a diluted contrast medium. Furthermore, the methods described above can also be used to improve stent visibility in fluoroscopic images.

Figure 10:
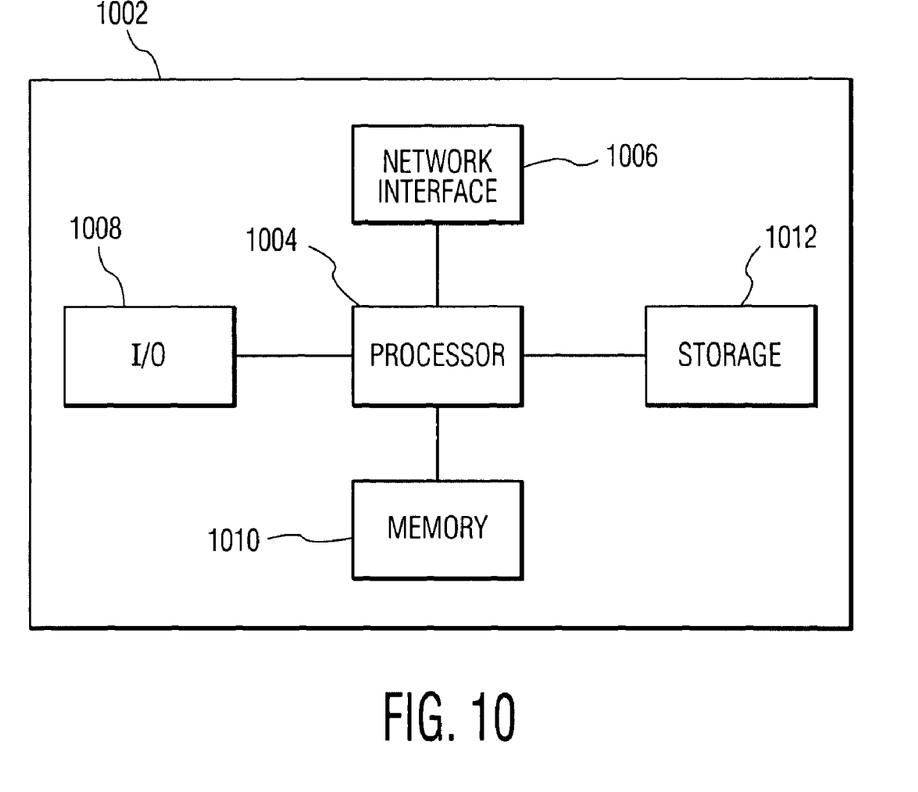
FIG. 10 is a high level block diagram of a computer capable of implementing the present invention.

The above-described methods for extracting motion-based layers from a sequence of fluoroscopic images may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012 (e.g., magnetic disk) and loaded into memory 1010 when execution of the computer program instructions is desired. Thus, applications for performing the above-described method steps, such as object detection, motion estimation, and layer extraction, be defined by the computer program instructions stored in the memory 1010 and/or storage 1012 and controlled by the processor 1004 executing the computer program instructions. Furthermore, sequences of fluoroscopic images as well as output motion-base layers can be stored in the storage 1012 and/or the memory 1010. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.) One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of extracting motion-based layers from a sequence of fluoroscopic images, comprising:
   detecting a portion of each of a plurality of objects in said sequence of fluoroscopic images;
   estimating motion of the detected portion of each of said plurality of objects in said sequence of fluoroscopic images; and
   extracting a plurality of image layers from said sequence of fluoroscopic images based on the motion estimated for said plurality of objects.

2. The method of claim 1, wherein said step of detecting a portion of each of a plurality of objects in said sequence of fluoroscopic images comprises:
   automatically detecting the portion of each of said plurality of objects using learning-based detection.

3. The method of claim 1, wherein said step of detecting a portion of each of a plurality of objects in said sequence of fluoroscopic images comprises:
   detecting the portion of said plurality of objects in each image in said sequence of fluoroscopic images.

4. The method of claim 1, wherein said step of estimating motion of the detected portion of each of said plurality of objects comprises:
   for an image in said sequence of fluoroscopic images, estimating motion of the detected portion of each of said plurality of objects between the image and another image in said sequence of fluoroscopic images.

5. The method of claim 4, wherein said step of estimating motion of the detected portion of each of said plurality of objects between the image and another image in said sequence of fluoroscopic images comprises:
   estimating motion of the detected portion of each of said plurality of objects between the image and a consecutive image in said sequence of fluoroscopic images.

6. The method of claim 4, wherein said step of estimating motion of the detected portion of each of said plurality of objects between the image and another image in said sequence of fluoroscopic images comprises:
   calculating motion vectors showing movement of the detected portion of each of said plurality of objects from the image to said another image.

7. The method of claim 6, wherein said step of extracting a plurality of image layers from said sequence of fluoroscopic images based on the motion estimated for said plurality of objects comprises:
   estimating motion fields over an image in said sequence of fluoroscopic images based on the motion vectors calculated for the detected portion of each of said plurality of objects for the image; and
   extracting said plurality of image layers for the image in said sequence of fluoroscopic images using least squares estimation based on the motion fields estimated for the image.

8. The method of claim 7, wherein said step of estimating motion fields over an image in said sequence of fluoroscopic images comprises:
   computing thin-plate spline models to extrapolate the motion vectors calculated for the detected portion of each of said plurality of objects over the image.

9. The method of claim 1, wherein said step of estimating motion of the detected portion of each of said plurality of objects in said sequence of fluoroscopic images comprises:
   tracking the detected portion of each of said plurality of objects over each image in the sequence of fluoroscopic images using learning-based tracking.

10. The method of claim 1, wherein said plurality of objects includes coronary vessels and a diaphragm.

11. The method of claim 10, wherein one of said plurality of image layers shows said coronary vessels.

12. An apparatus for extracting motion-based layers from a sequence of fluoroscopic images, comprising:
   means for detecting a portion of each of a plurality of objects in said sequence of fluoroscopic images;
   means for estimating motion of the detected portion of each of said plurality objects in said sequence of fluoroscopic images; and
   means for extracting a plurality of image layers from said sequence of fluoroscopic images based on the motion estimated for said plurality of objects.

13. The apparatus of claim 12, wherein said means for detecting a portion of each of a plurality of objects in said sequence of fluoroscopic images comprises:
   means for automatically detecting the portion of each of said plurality objects using learning-based detection.

14. The apparatus of claim 12, wherein said means for detecting a portion of each of a plurality of objects in said sequence of fluoroscopic images comprises:
   means for detecting the portion of said plurality of objects in each image in said sequence of fluoroscopic images.

15. The apparatus of claim 12, wherein said means for estimating motion of the detected portion of each of said plurality of objects comprises:
   means for estimating motion of the detected portion of each of said plurality of objects for a first image in said sequence of fluoroscopic images between said first image and a second image in said sequence of fluoroscopic images.

16. The apparatus of claim 15, wherein said means for estimating motion of the detected portion of each of said plurality of objects for said first image in said sequence of fluoroscopic images comprises:
   means for calculating motion vectors showing movement of the detected portion of each of said plurality of objects from said first image in said sequence of fluoroscopic images to said second image in said sequence of fluoroscopic images.

17. The apparatus of claim 16, wherein said first and second images are consecutive images in said sequence of fluoroscopic images.

18. The apparatus of claim 16, wherein said means for extracting a plurality of image layers from said sequence of fluoroscopic images based on the motion estimated for said plurality of objects comprises:
   means for estimating motion fields over an image in said sequence of fluoroscopic images based on the motion vectors calculated for the detected portion of each of said plurality of objects for the image; and
   means for extracting said plurality of image layers for the image in said sequence of fluoroscopic images using least squares estimation based on the motion fields estimated for the image.

19. The apparatus of claim 18, wherein said means for estimating motion fields over an image in said sequence of fluoroscopic images comprises:
   means for computing thin-plate spline models to extrapolate the motion vectors calculated for the detected portion of each of said plurality of objects over the image.

20. The apparatus of claim 12, wherein said means for estimating motion of the detected portion of each of said plurality of objects in said sequence of fluoroscopic images comprises:
   means for tracking the detected portion of each of said plurality of objects over each image in the sequence of fluoroscopic images using learning-based tracking.

21. A non-transitory computer readable medium encoded with computer executable instructions for extracting motion-based layers from a sequence of fluoroscopic images, the computer executable instructions defining steps comprising:
   detecting a portion of each of a plurality of objects in said sequence of fluoroscopic images;
   estimating motion of the detected portion of each of said plurality of objects in said sequence of fluoroscopic images; and
   extracting a plurality of image layers from said sequence of fluoroscopic images based on the motion estimated for said plurality of objects.

22. The computer readable medium of claim 21, wherein the computer executable instructions defining the step of detecting a portion of each of a plurality of objects in said sequence of fluoroscopic images comprise computer executable instructions defining the step of:
   automatically detecting the portion of each of said plurality of objects using learning-based detection.

23. The computer readable medium of claim 21, wherein the computer executable instructions defining the step of detecting a portion of each of a plurality of objects in said sequence of fluoroscopic images comprise computer executable instructions defining the step of:
   detecting the portion of said plurality of objects in each image in said sequence of fluoroscopic images.

24. The computer readable medium of claim 21, wherein the computer executable instructions defining the step of estimating motion of the detected portion of each of said plurality of objects comprise computer executable instructions defining the step of:
   for an image in said sequence of fluoroscopic images, estimating motion of the detected portion of each of said plurality of objects between the image and another image in said sequence of fluoroscopic images.

25. The computer readable medium of claim 24, wherein the computer executable instructions defining the step of estimating motion of the detected portion of each of said plurality of objects between the image and another image in said sequence of fluoroscopic images comprise computer executable instructions defining the step of:
   calculating motion vectors showing movement of the detected portion of each of said plurality of objects from the image to said consecutive image.

26. The computer readable medium of claim 25, wherein the computer executable instructions defining the step of extracting a plurality of image layers from said sequence of fluoroscopic images based on the motion estimated for said plurality of objects comprise computer executable instructions defining the steps of:
   estimating motion fields over an image in said sequence of fluoroscopic images based on the motion vectors calculated for the detected portion of each of said plurality of objects for the image; and
   extracting said plurality of image layers for the image in said sequence of fluoroscopic images using least squares estimation based on the motion fields estimated for the image.

27. The computer readable medium of claim 26, wherein the computer executable instructions defining the step of estimating motion fields over an image in said sequence of fluoroscopic images comprise computer executable instructions defining the step of:
   computing thin-plate spline models to extrapolate the motion vectors calculated for the detected portion of each of said plurality of objects over the image.

28. The computer readable medium of claim 21, wherein the computer executable instructions defining the step of estimating motion of the detected portion of each of said plurality of objects in said sequence of fluoroscopic images comprise computer executable instructions defining the step of:
   tracking the detected portion of each of said plurality of objects over each image in the sequence of fluoroscopic images using learning-based tracking.

* * * * *